United States Patent
Ito et al.

(10) Patent No.: US 11,268,884 B2
(45) Date of Patent: Mar. 8, 2022

(54) ABNORMALITY DIAGNOSTIC METHOD AND ABNORMALITY DIAGNOSTIC DEVICE FOR FEED AXIS DEVICE

(71) Applicant: OKUMA CORPORATION, Niwa-Gun (JP)

(72) Inventors: Mariko Ito, Niwa-Gun (JP); Takumi Hongo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/061,736

(22) Filed: Oct. 2, 2020

(65) Prior Publication Data

US 2021/0140853 A1 May 13, 2021

(30) Foreign Application Priority Data

Nov. 7, 2019 (JP) .............................. JP2019-202550

(51) Int. Cl.
*G06F 11/30* (2006.01)
*G01M 99/00* (2011.01)

(52) U.S. Cl.
CPC ................................. *G01M 99/005* (2013.01)

(58) Field of Classification Search
CPC ................................................ G01M 99/005
See application file for complete search history.

(56) References Cited

U.S. PATENT DOCUMENTS

2007/0194740 A1 8/2007 Shibata et al.

FOREIGN PATENT DOCUMENTS

| JP | 2007-219689 | * | 8/2007 |
| JP | 2007-219689 A1 | | 8/2007 |
| JP | 2013-164386 A1 | | 8/2013 |

* cited by examiner

*Primary Examiner* — Phuong Huynh
(74) *Attorney, Agent, or Firm* — Burr & Brown, PLLC

(57) ABSTRACT

An abnormality diagnostic method for a feed axis device that diagnoses an abnormality of the feed axis device including a screw shaft and a nut, the feed axis device being incorporated in mechanical equipment, the abnormality diagnostic method includes controlling an operation of the feed axis device such that the screw shaft operates in a predetermined operating pattern, detecting a physical quantity signal generated from the feed axis device, and performing an abnormality diagnosis for the feed axis device based on the physical quantity signal detected by the detecting in accordance with a predetermined abnormality diagnosis algorithm. The performing includes performing a frequency analysis on the physical quantity signal to extract respective frequencies corresponding to a plurality of operating positions in the operating pattern and performing the abnormality diagnosis based on change of the frequencies corresponding to the respective operating positions.

6 Claims, 4 Drawing Sheets

ABNORMALITY DIAGNOSTIC METHOD AND ABNORMALITY DIAGNOSTIC DEVICE FOR FEED AXIS DEVICE

This application claims the benefit of Japanese Patent Application Number 2019-202550 filed on Nov. 7, 2019, the entirety of which is incorporated by reference.

BACKGROUND

1. Technical Field

The disclosure relates to a method and a device that diagnose an abnormality of a feed axis device, in mechanical equipment such as a machine tool including the feed axis device by a ball screw.

2. Related Art

For example, among feed axis devices of machine tools, a system that transmits rotational motion of a motor to a ball screw to drive the ball screw is often used. However, in a machine that has been operated for several years, a preload loss by abrasion and a damage due to an entrance of foreign matter, a lubrication failure, or the like cause an accuracy failure, an abnormal noise, and the like possibly to occur. In the above-described state, a trouble of a shape defect, a failure in a pick feed direction, and the like of a workpiece occurs. Accordingly, it is preferred that machine components of the feed axis device such as the ball screw, a support bearing, and a guide be replaced before a deterioration or a damage occurs to cause the trouble.

Therefore, to know a state of the machine component of the feed axis device, it has been proposed various diagnostic methods such as a method that internally disposes a displacement sensor to measure a positioning accuracy, and a method that detects and diagnoses vibration of the ball screw, the support bearing, and a linear guide by a vibration sensor. In particular, Japanese unexamined patent application publication No. 2007-219689 (JP-A-2007-219689) discloses a method that calculates a deflection amount as a difference between a position detection value of a driven body and a position detection value of a motor and displays a warning for an abnormality of a machine when the magnitude of the deflection amount exceeds a threshold. Further, Japanese unexamined patent application publication No. 2013-164386 (JP-A-2013-164386) discloses a method that identifies which component that constitutes a ball screw has an abnormality by detecting a vibration and a rotational speed of the ball screw to perform a frequency analysis, and an order ratio analysis based on the rotational speed or a Campbell analysis based on the rotational speed, on a vibration signal.

A common machine tool often employs a semi-closed loop method where only a rotary encoder is used. However, since the machine in JP-A-2007-219689 employs a full-closed loop method, it cannot be applied to a machine that employs the semi-closed loop method. Further, in JP-A-2007-219689, a deflection amount detector is employed, and in JP-A-2013-164386, a sensor for diagnosis is added. In the methods, since there are more components than those in the minimum configuration used for controlling the feed axis device, there is a problem of causing a cost increase, and the increased parts that possibly break down causes a problem of an increased failure risk.

Therefore, the disclosure has been made in view of the above-described problems. It is an object of the disclosure to provide an abnormality diagnostic method and an abnormality diagnostic device that can perform an abnormality diagnosis for a feed axis device at low cost and low risk using a minimum configuration used for controlling the feed axis device in a machine tool.

SUMMARY

In order to achieve the above-described object, there is provided an abnormality diagnostic method for a feed axis device according to a first aspect of the disclosure. The abnormality diagnostic method diagnoses an abnormality of the feed axis device including a screw shaft and a nut. The feed axis device is incorporated in mechanical equipment. The abnormality diagnostic method includes the following three steps, operation control step, detecting step and abnormality diagnosis step. The operation control step is controlling an operation of the feed axis device such that the screw shaft operates in a predetermined operating pattern. The detecting step is detecting a physical quantity signal generated from the feed axis device. The abnormality diagnosis step is performing an abnormality diagnosis for the feed axis device based on the physical quantity signal detected by the detecting in accordance with a predetermined abnormality diagnosis algorithm. The abnormality diagnosis step includes performing a frequency analysis on the physical quantity signal to extract respective frequencies corresponding to a plurality of operating positions in the operating pattern and performing the abnormality diagnosis based on change of the frequencies corresponding to the respective operating positions.

In the disclosure of a second aspect in the above-described configuration, the abnormality diagnosis step includes comparing the change of the frequencies corresponding to the respective operating positions with bending vibration modes in the respective operating positions of the feed axis device to perform the abnormality diagnosis.

In the disclosure of a third aspect in the above-described configuration, the abnormality diagnosis compares proportions of the frequencies that are included within a predetermined region formed based on the bending vibration mode with a predetermined threshold, the frequencies corresponding to the respective operating positions.

In order to achieve the above-described object, there is provided an abnormality diagnostic device for a feed axis device according to a fourth aspect of the disclosure. The abnormality diagnostic device diagnoses an abnormality of the feed axis device including a screw shaft and a nut. The feed axis device is incorporated in mechanical equipment. The abnormality diagnostic device includes an operational control unit, a detecting unit, and an abnormality diagnosis unit. The operational control unit controls an operation of the feed axis device such that the screw shaft operates in a predetermined operating pattern. The detecting unit detects a physical quantity signal generated from the feed axis device. The abnormality diagnosis unit performs an abnormality diagnosis for the feed axis device based on the physical quantity signal detected by the detecting unit in accordance with a predetermined abnormality diagnosis algorithm. The abnormality diagnosis unit performs a frequency analysis on the physical quantity signal to extract respective frequencies corresponding to a plurality of operating positions in the operating pattern and performs the abnormality diagnosis based on change of the frequencies corresponding to the respective operating positions.

In the disclosure of a fifth aspect in the above-described configuration, the abnormality diagnosis unit compares change of the frequencies corresponding to the respective operating positions with bending vibration modes in the respective operating positions of the feed axis device to perform the abnormality diagnosis.

In the disclosure of a sixth aspect in the above-described configuration, the abnormality diagnosis compares proportions of the frequencies that are included within a predetermined region formed based on the bending vibration mode with a predetermined threshold, the frequencies corresponding to the respective operating positions.

With the disclosure, the abnormality diagnosis can be performed without adding another component such as a sensor to the minimum configuration used for the control of the feed axis device. As a result, the increase of a failure risk due to the addition of, for example, the sensor do not occur. Therefore, the abnormality diagnosis for the feed axis device can be performed at low cost and low risk.

DETAILED DESCRIPTION

The following describes embodiments of the disclosure based on the drawings.

Figure 1:
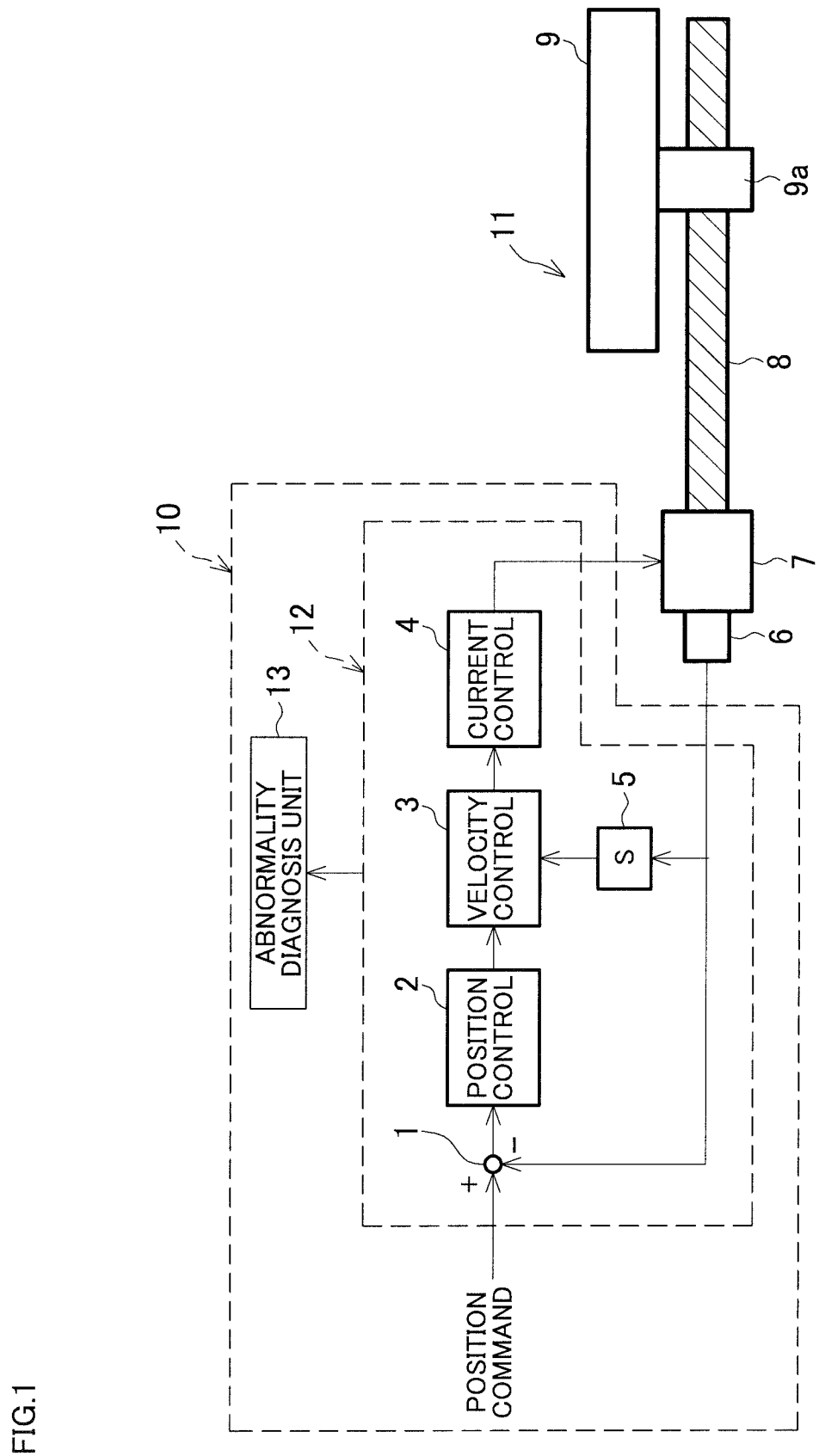
FIG. 1 is a block diagram of a feed axis device and a position control device.

FIG. 1 is an exemplary block diagram of a feed axis device and a position control device in a machine tool to which the disclosure is applied.

A feed axis device 11 rotatably drives a ball screw 8 with a motor 7 to linearly move a moving body 9 on which a nut 9a is screwed with the ball screw 8.

In a position control device 12, a position command from an NC device 10 and a current position from a position detector 6 mounted on the motor 7 are input to an adder 1, and then, a calculated position deviation is input to a position controller 2. The position controller 2 generates a speed command value corresponding to a position error amount. A velocity controller 3 generates a torque command value corresponding to a speed detection value obtained by operating the speed command value and the current position with a differentiator 5. A current controller 4 controls a current to the motor 7 based on the input torque command value. Information used in the processes, which includes the current position detected at the position detector 6, can be recorded and displayed at the NC device 10 including the position control device 12.

Here, the NC device 10 includes an abnormality diagnosis unit 13 that acquires change of a frequency corresponding to an operating position of the feed axis device 11 to perform an abnormality diagnosis for the feed axis device 11 and also functions as an abnormality diagnostic device.

Figure 2:
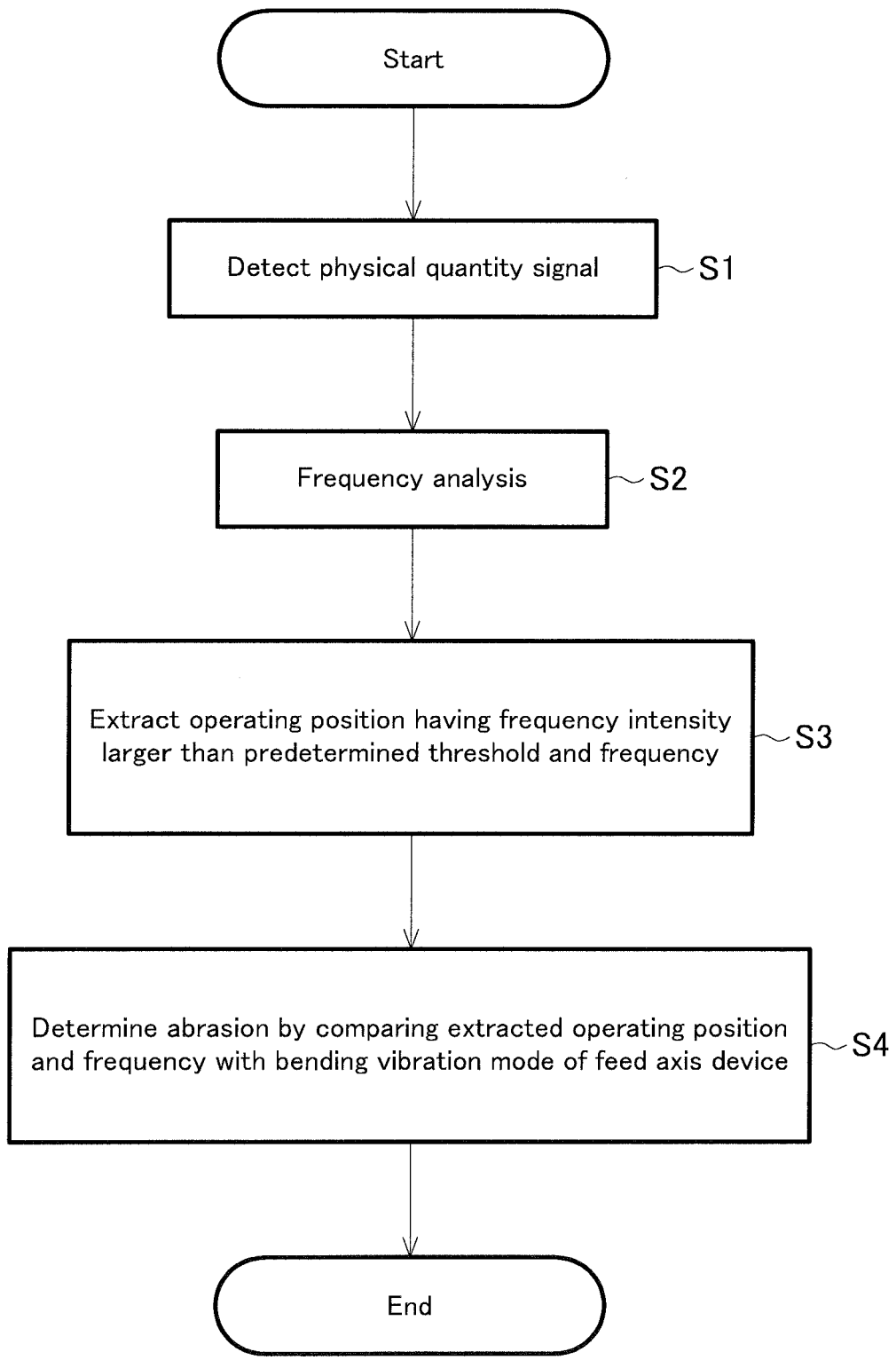
FIG. 2 is a flowchart illustrating a procedure of an abnormality diagnosis.

The abnormality diagnosis unit 13 functions as an operational control unit, a detecting unit, and an abnormality diagnosis unit of the disclosure based on a program to perform the abnormality diagnosis for the feed axis device 11. The program is stored in a storage unit of the NC device 10 and is created in accordance with a predetermined abnormality diagnosis algorithm. The following describes a procedure of the abnormality diagnosis by the abnormality diagnosis unit 13 based on the flowchart in FIG. 2.

First, at S (abbreviation of "STEP," the same applies to the following) 1, the feed axis device 11 is operated in a predetermined operating pattern to detect a physical quantity signal generated from the feed axis device 11 (operational control step and detecting step).

Next, at S2, a frequency analysis is performed on data of the detected physical quantity signal.

Subsequently, at S3, the frequency corresponding to the operating position and its frequency intensity are calculated from the frequency analysis result to extract the operating position having a frequency intensity larger than a predetermined threshold and the frequency.

Then, at S4, a matching degree of a relationship between the extracted operating position and frequency and a relationship between the operating position at which a bending vibration mode occurs in the feed axis device 11 and its frequency is determined to determine abrasion of the ball screw 8 (S2 to S4: abnormality diagnosis step). The bending vibration mode of the feed axis device 11 is calculated by substituting parameters of the feed axis device 11 into Formula (1) of a bending vibration mode (natural frequency) of a beam illustrated below.

[Math. 1]

$$f = \frac{\omega}{2\pi} = \frac{1}{2\pi} \frac{\lambda^2}{l^2} \sqrt{\frac{EI}{\rho A}} \tag{1}$$

Here, a dimensionless constant defined by a boundary condition and a vibration mode is denoted as $\lambda$. A length of the beam is denoted as l. A Young's modulus of a beam material is denoted as E. The second moment of area of the beam is denoted as I. A mass per unit volume of the beam material is denoted as $\rho$. A cross-sectional area of the beam is denoted as A.

Next, specific examples of the above-described abnormality diagnostic method are described.

First, a predetermined operation pattern at S1 is configured to move by one-way full stroke of the ball screw 8 at a constant speed, and the torque command value is employed as the physical quantity signal to be detected.

At S2, the frequency analysis with respect to the data of the detected torque command value performs an FFT on data of the torque command value separated for each constant stroke zone to obtain an FFT result for the data of the torque command value for the full stroke.

At S3, by associating the stroke zone on which the FFT has been performed with the FFT result, the frequencies corresponding to respective operating positions and their frequency intensities are calculated to extract the operating position having the frequency intensity larger than the predetermined threshold and the frequency.

Figure 3:
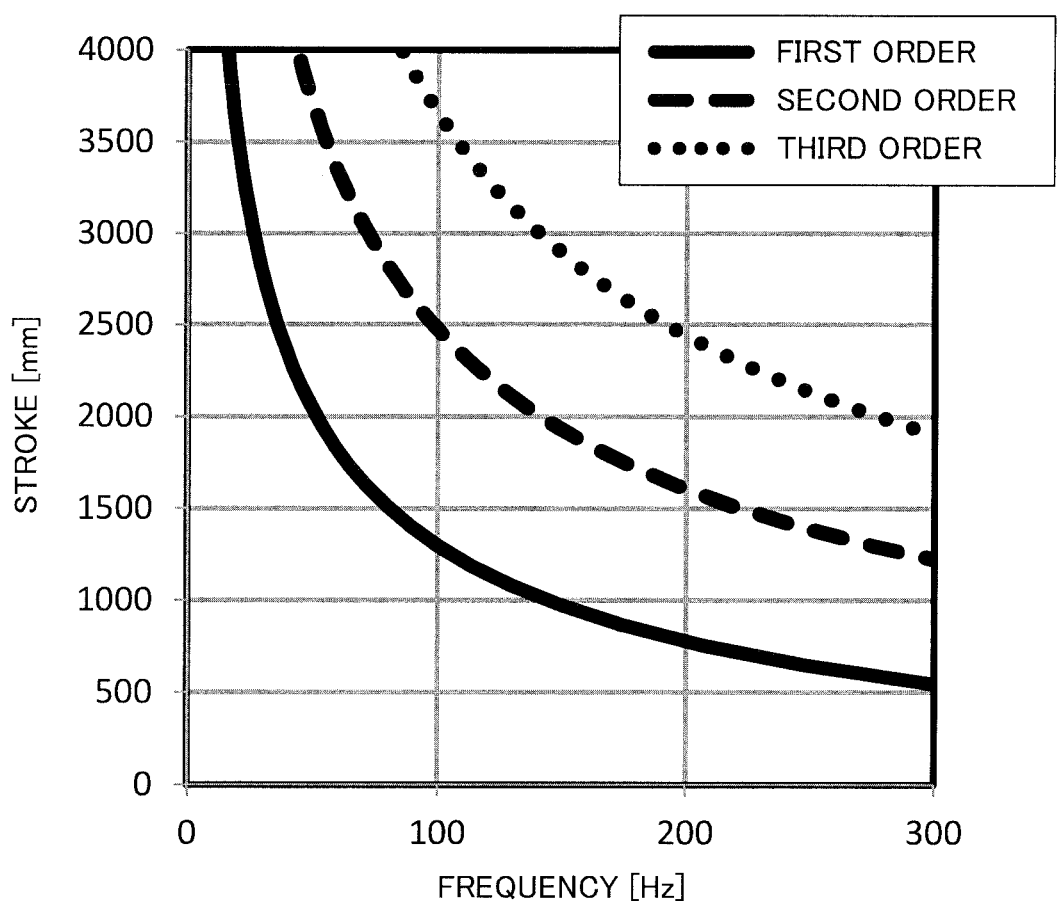
FIG. 3 is an explanatory diagram illustrating a bending vibration mode of the feed axis device.

At S4, the bending vibration mode of the feed axis device 11 illustrated in FIG. 3 is calculated by substituting the parameters of the feed axis device 11 into Formula (1) of the bending vibration mode of the beam. The $\lambda$ is a value that varies depending on a support state of the ball screw 8. The l denotes a distance from a support bearing of the ball screw 8 to the nut 9a, and is calculated using, for example, the center of the nut 9a. The E denotes a Young's modulus of the ball screw 8, the I denotes the second moment of area of the ball screw 8, the p denotes a density of the ball screw 8, and the A denotes a cross-sectional area of the ball screw 8.

Figure 4:
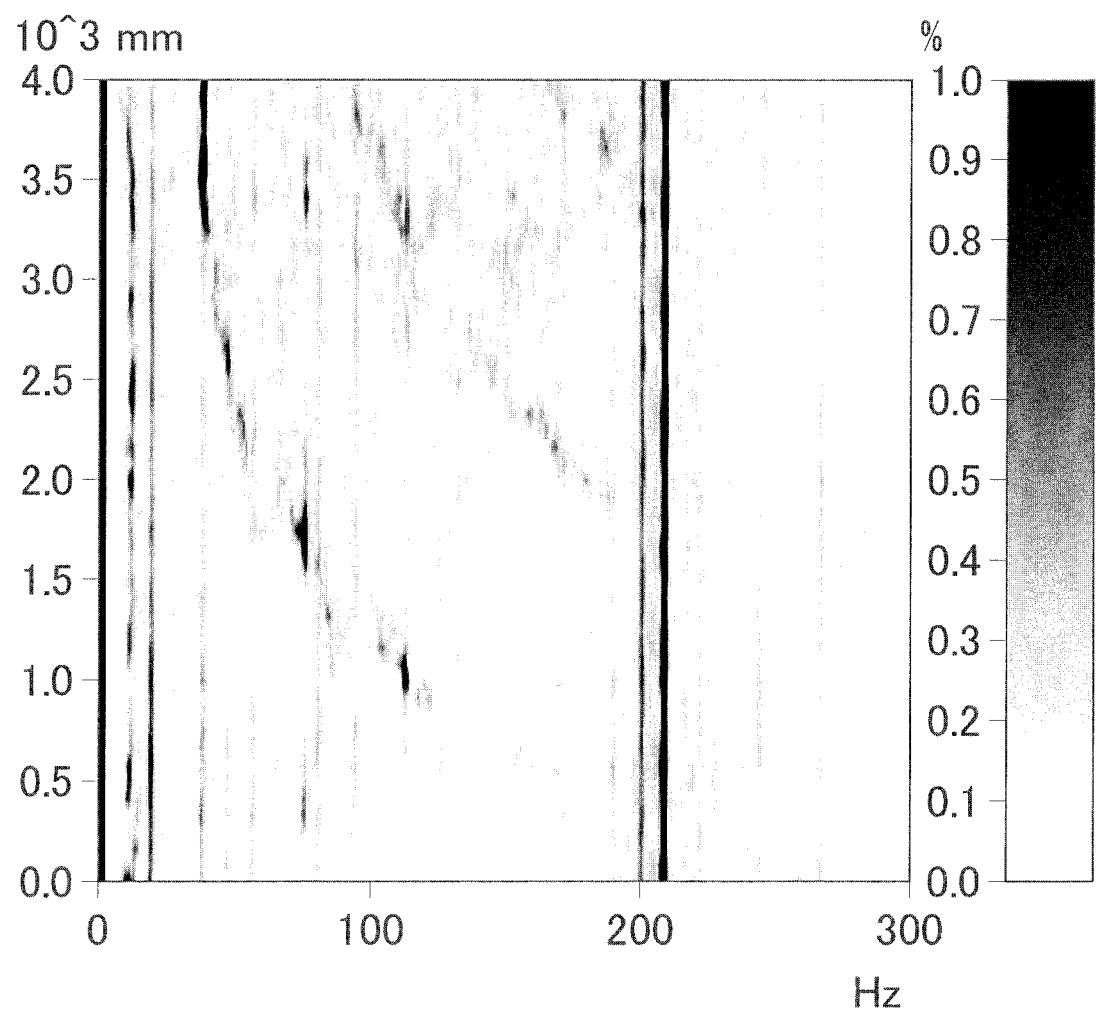
FIG. 4 is an explanatory diagram illustrating a relationship between extracted operating position and frequency.

FIG. 4 illustrates the relationship between the operating position and the frequency, which are extracted at S3, and is a case where an operation sound is large while an abrasion occurs on the ball screw 8. Appearance of the curved line as illustrated in FIG. 3 can be confirmed.

Then, when confirming the matching degree of the relationship between the extracted operating position and frequency and the relationship between the operating position at which the bending vibration mode occurs and the frequency, for example, the value of 4.730 in the first order vibration mode with both-end fix as the boundary condition is substituted for λ in Formula (1). The first order curved line thus obtained of the bending vibration mode of the feed axis device 11, which is indicated by the solid line in FIG. 3, is set as the center to form a region A1 (region surrounded by the one dot chain lines in FIG. 4) on both the sides having widths. The method to form the widths may form a range obtained by moving the curved line as the center in parallel and form the range apart from the curved line as the center by a certain distance in normal directions of the curved line. Additionally, the whole region of the relationship between the operating position and the frequency is denoted as A2 (region surrounded by the dotted line in FIG. 4).

Within the set region A1, a proportion of the region having a frequency intensity equal to or more than an average value of the frequency intensities in the region A2 is calculated, and a case where the calculation result is larger than the predetermined threshold is diagnosed as the abnormality (abrasion of the ball screw 8). The predetermined threshold may be, for example, a proportion of the region having a frequency intensity equal to or more than the average value of the frequency intensities in the region A2. The diagnostic result is displayed on a monitor of the NC device 10 and/or is notified by sounding a warning sound.

Thus, according to the abnormality diagnostic method and the NC device 10 (abnormality diagnostic device) for the feed axis device 11 in the above-described configuration, the following steps are performed on the feed axis device 11, which includes the ball screw 8 (screw shaft) and the nut 9a and is incorporated in the machine tool. The following steps include: an operational control step (S1) of controlling an operation of the feed axis device 11 such that the ball screw 8 operates in a predetermined operating pattern; a detecting step (S1) of detecting the torque command value (physical quantity signal) generated from the feed axis device 11; and an abnormality diagnosis step of performing an abnormality diagnosis for the feed axis device 11 based on the torque command value detected by the detecting step. In the abnormality diagnosis step, a frequency analysis is performed on the torque command value (S2) to extract respective frequencies corresponding to a plurality of operating positions in the operating pattern (S3), and the abnormality diagnosis is performed by comparing the change of the frequencies corresponding to the respective operating positions with the bending vibration mode (S4).

Accordingly, the abnormality diagnosis can be performed without adding another component, such as a sensor to the minimum configuration used for controlling the feed axis device 11. As a result, there is no increase in cost and failure risk due to the added sensor and the like does not occur. Therefore, the abnormality diagnosis for the feed axis device 11 can be performed at low cost and low risk.

While the embodiment employs the torque command value to the motor as the physical quantity signal to be detected, as the most beneficial example, a sound and a vibration may be detected as long as they are the physical quantity signals generated from the feed axis device. Additionally, the curved lines of the bending vibration mode of the feed axis device to be compared may be extended using a high order, such as the second and third order curved lines indicated by the dotted lines in FIG. 3, as necessary.

Further, the method that acquires the change of the frequency corresponding to the operating position to perform the diagnosis has been described by narrowing down to a method that extracts the operating position having the frequency intensity larger than the predetermined threshold and the frequency to compare them with the bending vibration mode of the feed axis device. However, the diagnostic method is not limited to the configuration. For example, an image on which the frequency analysis results corresponding to the plurality of operating positions are displayed in a color map may be input to a neural network that preliminarily has learned a feature of the frequency that changes depending on the operating position at abnormality to perform the abnormality diagnosis. Similarly, the frequency analysis results corresponding to the plurality of operating positions may be input to the neural network as a matrix to perform the abnormality diagnosis.

Furthermore, in the embodiment, the abrasion of the ball screw is diagnosed as the abnormality. However, since a runout of the ball screw causes also the bending vibration mode, the disclosure can be also used for a determination of a runout state at assembly.

Besides, the abnormality diagnostic device can be arranged separately from the NC device and connected to the NC device by wire or wirelessly to perform the abnormality diagnosis. In this case, abnormality diagnoses for a plurality of machine tools can be concurrently performed.

The disclosure is applicable, not limited to the machine tool, but also to other mechanical equipment that includes the feed axis device.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An abnormality diagnostic method for a feed axis device that diagnoses an abnormality of the feed axis device including a screw shaft and a nut, the feed axis device being incorporated in mechanical equipment, the abnormality diagnostic method comprising:
   controlling an operation of the feed axis device such that the screw shaft operates in a predetermined operating pattern;
   detecting a physical quantity signal generated from the feed axis device; and
   performing an abnormality diagnosis for the feed axis device based on the physical quantity signal detected by the detecting in accordance with a predetermined abnormality diagnosis algorithm, wherein
   the performing includes performing a frequency analysis on the physical quantity signal to extract respective frequencies corresponding to a plurality of operating positions in the operating pattern and performing the abnormality diagnosis based on change of the frequencies corresponding to the respective operating positions.

2. The abnormality diagnostic method for the feed axis device according to claim 1, wherein
the performing includes comparing the change of the frequencies corresponding to the respective operating positions with bending vibration modes in the respective operating positions of the feed axis device to perform the abnormality diagnosis.

3. The abnormality diagnostic method for the feed axis device according to claim 2, wherein
the abnormality diagnosis compares proportions of the frequencies that are included within a predetermined region formed based on the bending vibration mode with a predetermined threshold, the frequencies corresponding to the respective operating positions.

4. An abnormality diagnostic device for a feed axis device that diagnoses an abnormality of the feed axis device including a screw shaft and a nut, the feed axis device being incorporated in mechanical equipment, the abnormality diagnostic device comprising:
an operational control unit that controls an operation of the feed axis device such that the screw shaft operates in a predetermined operating pattern;
a detecting unit that detects a physical quantity signal generated from the feed axis device; and
an abnormality diagnosis unit that performs an abnormality diagnosis for the feed axis device based on the physical quantity signal detected by the detecting unit in accordance with a predetermined abnormality diagnosis algorithm, wherein
the abnormality diagnosis unit performs a frequency analysis on the physical quantity signal to extract respective frequencies corresponding to a plurality of operating positions in the operating pattern and performs the abnormality diagnosis based on change of the frequencies corresponding to the respective operating positions.

5. The abnormality diagnostic device for the feed axis device according to claim 4, wherein
the abnormality diagnosis unit compares change of the frequencies corresponding to the respective operating positions with bending vibration modes in the respective operating positions of the feed axis device to perform the abnormality diagnosis.

6. The abnormality diagnostic device for the feed axis device according to claim 5, wherein
the abnormality diagnosis compares proportions of the frequencies that are included within a predetermined region formed based on the bending vibration mode with a predetermined threshold, the frequencies corresponding to the respective operating positions.

* * * * *